May 4, 1954 C. M. MacCHESNEY 2,677,200

PHONETIC SOUND PRODUCING DICTIONARY APPARATUS

Filed Nov. 28, 1952 2 Sheets-Sheet 1

INVENTOR.

Chester M. MacChesney

BY

Smith, Olsen & Baird

Attys.

PHONETIC SOUND PRODUCING DICTIONARY APPARATUS

Filed Nov. 28, 1952 2 Sheets-Sheet 2

INVENTOR.
Chester M. MacChesney
BY
Smith, Olsen & Baird
Attys.

Patented May 4, 1954 2,677,200

UNITED STATES PATENT OFFICE 2,677,200

PHONETIC SOUND PRODUCING DICTIONARY APPARATUS

Chester M. MacChesney, Chicago, Ill., assignor to Ellamac Incorporated, Chicago, Ill., a corporation of Illinois Application November 28, 1952, Serial No. 322,983

15 Claims. (Cl. 35—35)

The present invention relates to phonetic sound producing dictionary apparatus, and more particularly to improved apparatus of the general character of that disclosed in United States Patent No. 2,603,006, granted July 15, 1952, to Chester M. MacChesney and Ella B. Wenger.

This pronouncing dictionary apparatus employs a record card bearing an array of symbols indicative of the spelling of a given word and a magnetic medium having magnetically recorded thereon phonetic characters indicative of the pronunciation of the given word, and comprises a sound reproduction unit that is arranged to support the record card and to move or feed it across a cooperating magnetic pick-up head, whereby the array of symbols mentioned may be viewed by an observer at the same time that the unit pronounces the given word; also the record card usually carries an appropriate printing giving the accepted definition or meaning of the given word.

It is the general object of the present invention to provide dictionary apparatus of the character noted that is of improved and simplified construction and arrangement permitting a better view and study of the word by the observer preliminary to the pronunciation thereof by the unit and accommodating easier placement and removal of the record card with respect to the unit.

Another object of the invention is to provide in a sound reproduction unit that is controlled by magnetic recordings borne upon magnetic media carried by record cards, an improved guiding and feeding arrangement for the record cards that insures positive and uniform movement of the record cards with respect to the cooperating magnetic pick-up head during the sensing of the magnetic recordings.

Another object of the invention is to provide in a sound reproduction unit of the character noted, improved magnetic record card guiding and feeding mechanism that insures proper positioning of the magnetic medium carried by a record card with respect to the cooperating magnetic pick-up head during a sensing operation and that prevents wear of the pole pieces of the head in the normal operation of the unit.

Further features of the invention pertain to the particular arrangement of the elements of the phonetic sound producing dictionary apparatus and of the record card, whereby the above-outlined and additional operating features thereof are attained.

The invention, both as to its organization and method of operation, together with further objects and advantages thereof, will best be understood by reference to the following specification taken in connection with the accompanying drawings, in which:

Fig. 4 is an electrical diagram of the circuit elements incorporated in the apparatus shown in Fig. 1;

Fig. 6 is an enlarged top view of the upper floating roller forming a part of the mechanism of Fig. 5;

Fig. 7 is an enlarged left-hand end view of the upper floating roller shown in Fig. 6;

Figures 1, 2, 3A, 3B, 3C, 3D:
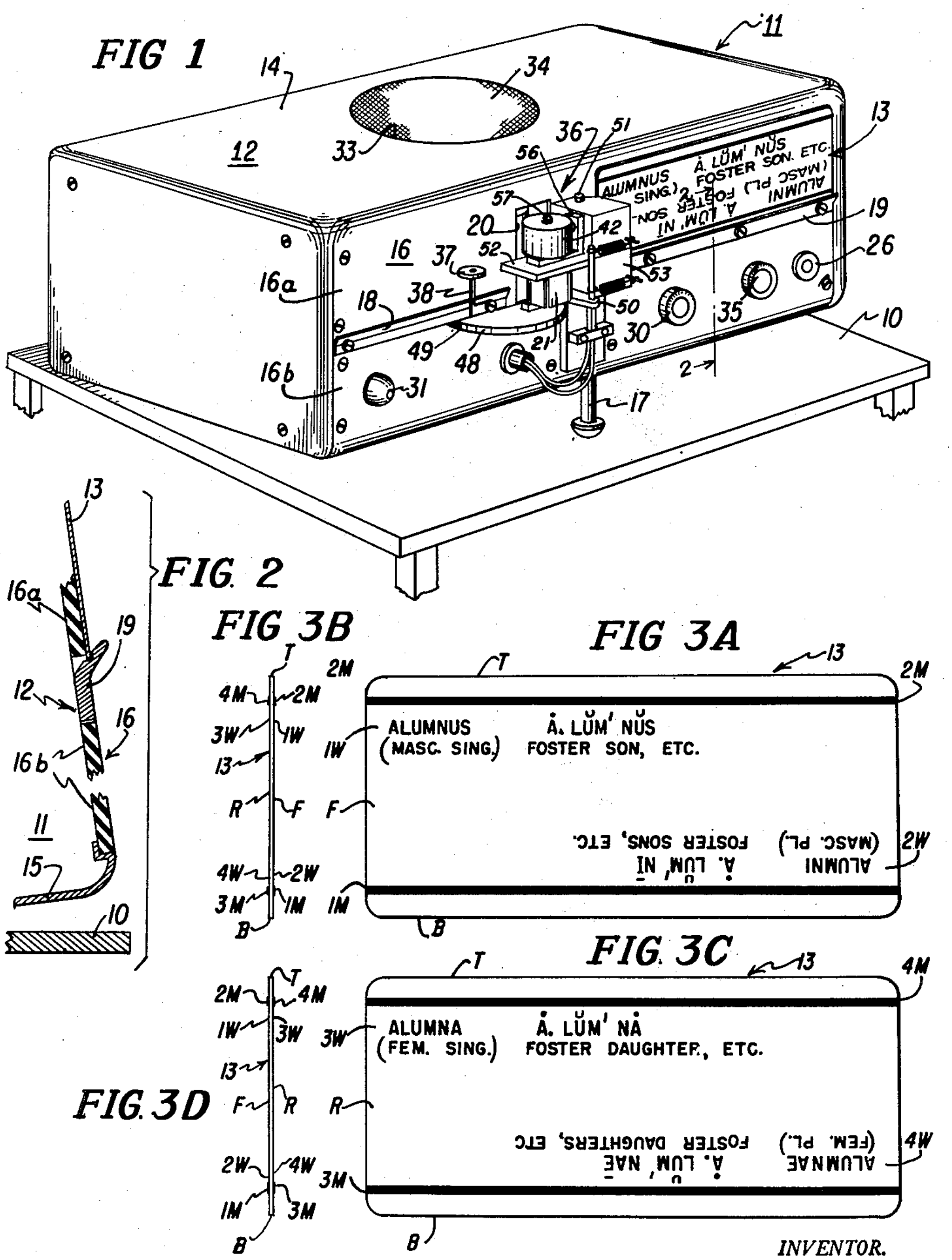
Figure 1 is a fragmentary perspective view of a table supporting phonetic sound producing dictionary apparatus embodying the present invention; and essentially comprising a sound reproduction unit and a cooperating magnetic record card.
Fig. 2 is an enlarged fragmentary vertical sectional view of a portion of the front wall of the unit and the supported record card, illustrating the relationship therebetween and indicating the relationship between the unit and the supporting table, this figure being taken in the direction of the arrows along the line 2—2 in Fig. 1.
Fig. 3A is an enlarged face view of the front side of the record card shown in Fig. 1.
Fig. 3B is an enlarged end view of the adjacent left-hand end of the record card in relation to its position shown in Fig. 3A.
Fig. 3C is an enlarged face view of the rear side of the record card shown in Fig. 3A.
Fig. 3D is an enlarged end view of the adjacent left-hand end of the record card in relation to its position shown in Fig. 3C.
Figure 8:
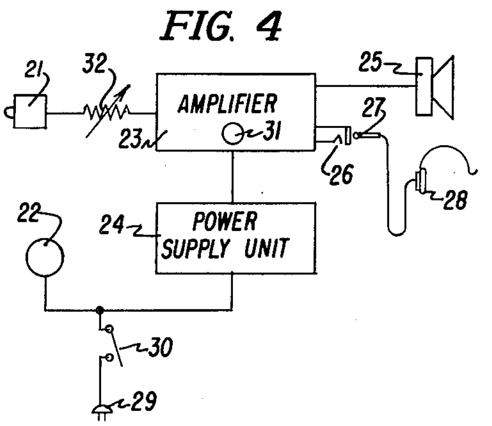
Fig. 8 is an enlarged fragmentary top view of the magnetic pick-up head operatively associated with the mechanism shown in Fig. 5.
Figure 5:
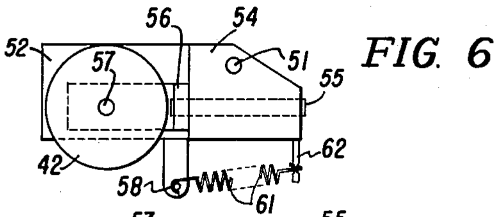
Fig. 5 is an enlarged fragmentary left-hand end view of the record card guiding and feeding mechanism incorporated in the unit shown in Fig. 1.
Figure 9:
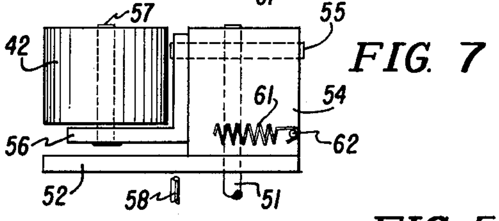
Fig. 9 is an enlarged front view of the head shown in Fig. 8.

Referring now to Figs. 1 and 2 of the drawings, there is illustrated a table 10 supporting phonetic sound producing dictionary apparatus 11 embodying the features of the present invention and essentially comprising a sound reproduction unit 12 and a cooperating magnetic record card 13. Specifically, the unit 12 is readily portable and comprises a casing provided with wall structure including top and bottom walls 14 and 15 and a front wall 16. The unit 12 is normally supported upon the table 10 so that the front wall 16 slopes upwardly and slightly rearwardly with respect to the top surface of the table 10, as clearly illustrated; which arrangement insures proper support of the record card 13, and is achieved fundamentally by the provision of a substantially centrally disposed foot 17 carried by the front portion of the bottom wall 15 and engaging the top surface of the table 10. More particularly, the front wall 16 includes upper and lower panels 16*a* and 16*b*, and an intermediate guide consisting essentially of left-hand and right-hand rails 18 and 19, the inner ends of the rails 18 and 19 being arranged in spaced-apart relation adjacent to an upstanding substantially rectangular index opening 20 formed in the upper panel 16*a* intermediate the ends thereof and somewhat toward the left-hand side thereof, as illustrated in Fig. 1.

As best shown in Fig. 4, the unit 11 comprises a magnetic pick-up head 21, a drive motor 22, an amplifier 23, a power supply unit 24, a loudspeaker 25, and a jack 26, the jack 26 being arranged to receive a cooperating plug 27 operatively connected to a receiver 28. Also the unit 12 includes a connector plug 29 that is adapted to be inserted into an associated socket, not shown, connected to a source of power supply of 110-volts single-phase A. C., as well as a master switch 30 and a pilot light 31. In the arrangement, the head 21 is operatively connected via an adjustable resistor 32 to the input circuit of the amplifier 23, the adjustable resistor 32 accomplishing volume control in a conventional manner; the plug 29 is operatively connected to the switch 30; the switch 30 is operatively connected to the drive motor 22 and to the power supply unit 24; and the power supply unit 24 is operatively connected to supply power to the amplifier 23. The output circuit of the amplifier 23 is operatively connected to the loudspeaker 25 and to the jack 26; whereby the output circuit of the amplifier 23 may be connected via the jack 26 and the plug 27 to the receiver 28.

Again referring to Fig. 1, all of the above-named elements of the unit 12, with the exception of the pick-up head 21, are housed in the casing thereof, the top wall 14 having an opening 33 formed therein that is operatively associated with the diaphragm of the loudspeaker 25, and covered by an associated protective foraminous sheet 34. As illustrated in Fig. 1, the pilot light 31, the master switch 30 and the jack 26 are carried on the lower panel 16*b*; and also the manually operable control knob 35 for the adjustable volume control resistor 32 is carried on the lower panel 16*b*. Further, the unit 12 incorporates guiding and feeding mechanism 36 carried by the front wall 16 and operatively associated with the opening 20 formed in the upper panel 16*a*; which mechanism 36 is employed for the purpose of controlling the guiding and feeding movement of the record card 13 across the head 21 that is also operatively associated with the index opening 20, the operation of the mechanism 36 being described in detail hereinafter.

Referring now to Figs. 3A, 3B, 3C and 3D, it is noted that the record card 13 essentially comprises a flat sheet formed of paper, or the like, and having a substantially rectangular configuration; whereby the record card 13 comprises a front surface or face F, a rear surface or face R, two substantially parallel side edges and two substantially parallel end edges, the two side edges being hereinafter termed, for reference purposes, the top edge T and the bottom edge B, respectively. As illustrated, the record card 13 bears four arrays of symbols respectively indicated at 1W, 2W, 3W and 4W, and respectively corresponding to the words: "alumnus," "alumni," "alumna" and "alumnae," employed only for the purpose of description. Each array of symbols 1W, etc., indicates the spelling and preferred pronunciation of the corresponding word, as well as a definition thereof. In the arrangement, the words 1W, etc., may be printed on the record card 13; the word 1W begins adjacent to the upper left-hand front face of the card 13 and the printing is disposed upright from left to right as shown in Fig. 3A; the word 2W begins adjacent to the lower right-hand front face of the card 13 and the printing is disposed inverted from right to left as shown in Fig. 3A; the word 3W begins adjacent to the upper left-hand rear face of the card 13 and the printing is disposed upright from left to right as shown in Fig. 3C; and the word 4W begins adjacent to the lower right-hand rear face of the card 13 and the printing is disposed inverted from right to left as shown in Fig. 3C. Thus it will be understood that an observer may read directly the word 1W when the card occupies its position of Fig. 3A; while the card 13 must be rotated 180° from its position of Fig. 3A so that the observer may read the word 2W. Similarly the card 13 is reversed 180° so that the word 3W is in normal position to the observer, as illustrated in Fig. 3C; while the card 13 must be further rotated 180° so that the word 4W is in normal position to the observer as illustrated in Fig. 3C.

Further, the card 13 comprises four magnetic media 1M, 2M, 3M, 4M respectively corresponding to the words 1W, 2W, 3W and 4W; the magnetic medium 1M being carried on the lower front of the card 13 in a position substantially parallel to the bottom edge B; the magnetic medium 2M being carried on the upper front of the card 13 in a position substantially parallel to the top edge T; the magnetic medium 3M being carried on the lower rear of the card 13 in a position substantially parallel to the bottom edge B; and the magnetic medium 4M being carried on the upper rear of the card 13 in a position substantially parallel to the top edge T. In the arrangement, magnetic recordings in the form of phonetic characters indicative of the pronunciation of the corresponding words 1W, etc., are recorded upon the respective magnetic medium 1M, etc. Also in the arrangement, the words 1W, etc., are disposed substantially parallel to the respective adjacent edges of the card 13 and spaced therefrom a first predetermined distance; and likewise the magnetic media 1M, etc., are disposed substantially parallel to the respective adjacent edges of the card 13 and spaced therefrom a second predetermined distance. For example, the card 13 may have a length of 9'' and a width of 3½''; the center lines of the magnetic media 1M, etc., are spaced ⅝'' from the respective adjacent edges of the card 13; and each of the magnetic media 1M, etc., may have a width of about $\frac{5}{16}$''; the card 13 having a thickness appropriate to render it reasonably stiff and yet flexible. Thus it will be appreciated that the magnetic media 1M and 3M are arranged in superimposed relation through the bottom of the card 13; and the magnetic media 2M and 4M are arranged in superimposed relation through the top of the card 13.

Again referring to Fig. 1, it will be observed that the right-hand rail 19 is somewhat longer than the left-hand rail 18 so that it really accommodates supporting the card 13 in an upstanding position clearly visible to the observer; and of course, it will be understood that when any one of the words 1W, etc., is arranged in the upper left-hand position of the card 13, in view of its supported position upon the rail 19, the corresponding magnetic media 1M, etc., is arranged in alignment with the head 21 so that when the mechanism 36 is operating and the card 13 is moved slightly toward the left into cooperating relation with the mechanism 36, the card 13 is automatically moved or fed by the mechanism 36 from the right toward the left causing the aligned magnetic medium 1M, etc., to be moved across the index opening 20 and across the head 21 in operative relation therewith so that the magnetic medium mentioned is scanned or sensed by the head 21 causing the loudspeaker 25 to pronounce the word during viewing thereof by the observer. More particularly, the rails 18 and 19 are disposed in substantially horizontal alignment, whereby the record card 13 is moved by the mechanism 36 from its supported position upon the rail 19 onto a supported position on the rail 18. In this connection, it is noted that an idler wheel 37 is rotatably mounted on an upstanding resilient element 38 secured to the rail 18 adjacent to the index opening 20 and biased toward the panel 16*a*; which arrangement exerts a clamping action upon the right-hand end of the record card 13 when it is supported upon the rail 18, thereby preventing tilting of the record card 18 out of its supported position upon the rail 18 after feeding of the record card 13 through the mechanism 36. This arrangement not only prevents falling of the record card 13 from its supported position upon the panel 16*a* but it positively prevents improper movement of the magnetic medium being sensed by the head 21 from its normal position of alignment therewith.

Referring now to Figs. 5 to 9, inclusive, it is noted that the guiding and feeding mechanism 36 is supported upon the front wall 16 adjacent to the index opening 20 formed therein, and essentially comprises an upper inner drive roller 39 and a lower floating roller 40 commonly mounted upon a substantially vertically disposed axle 41 and projecting into the opening 20, as well as an upper outer floating roller 42 mounted for rotation about a substantially vertically disposed axis. More particularly, the axle 41 is rotatably mounted in upper and lower bearings 43 and 44 carried by respectively associated supporting arms 45 and 46, the roller 39 being rigidly secured to the upper portion of the axle 41 and the roller 40 being loosely mounted upon the lower portion of the axle 41, and the rollers 39 and 40 being retained in proper relation by an intervening collar 47 surrounding the intermediate portion of the axle 41. Finally, the extreme lower end of the axle 41 disposed below the bearing 44 has a friction wheel 48 rigidly secured thereto, the wheel 48 projecting forwardly out of a slot 49 formed in the lower panel 16*b* below the index opening 20 and somewhat toward the left-hand side thereof, as illustrated in Fig. 1.

More particularly, a bracket 50 is secured to the upper edge of the lower panel 16*b* adjacent to the bottom of the index opening 20 formed in the upper panel 16*a* and carries a substantially vertically disposed pivot pin 51 arranged forwardly of the front wall 16; and the head 21 is secured to the left-hand end of an arm 52, the right-hand end of which is secured to the top of a block 53 that is pivotally mounted upon the lower portion of the pivot pin 51. Also a block 54 is arranged above the arm 52 and pivotally mounted upon the upper end of the pivot pin 51; which block 54 carries a substantially horizontally disposed pivot pin 55 on the left-hand end of which a substantially L-shaped bracket 56 is secured. The bracket 56, in turn, carries a substantially vertically disposed pivot pin 57 upon which the roller 42 is rotatably mounted. Also, the bracket 50 carries an upstanding pin 58; a coil spring 59 being disposed between the pin 58 and a pin 60 carried by the block 53; and a coil spring 61 being disposed between the pin 58 and a pin 62 carried by the block 54. Accordingly, the coil spring 59 biases the block 53 in the clockwise direction about the pivot pin 51, as viewed in Fig. 8, so that the head 21 is biased toward the floating roller 40, the head 21 including a pair of spaced-apart pole pieces 63 aligned with respect to the floating roller 40 and adapted to engage the magnetic medium 1M, etc., upon the record card 13 as the record card 13 is moved across the index opening 20 provided in the upper panel 16*a*. Likewise the coil spring 61 biases the block 54 in the clockwise direction about the pivot pin 51, as viewed in Fig. 6, so that the floating roller 42 is biased toward the drive roller 39.

Figure 10:
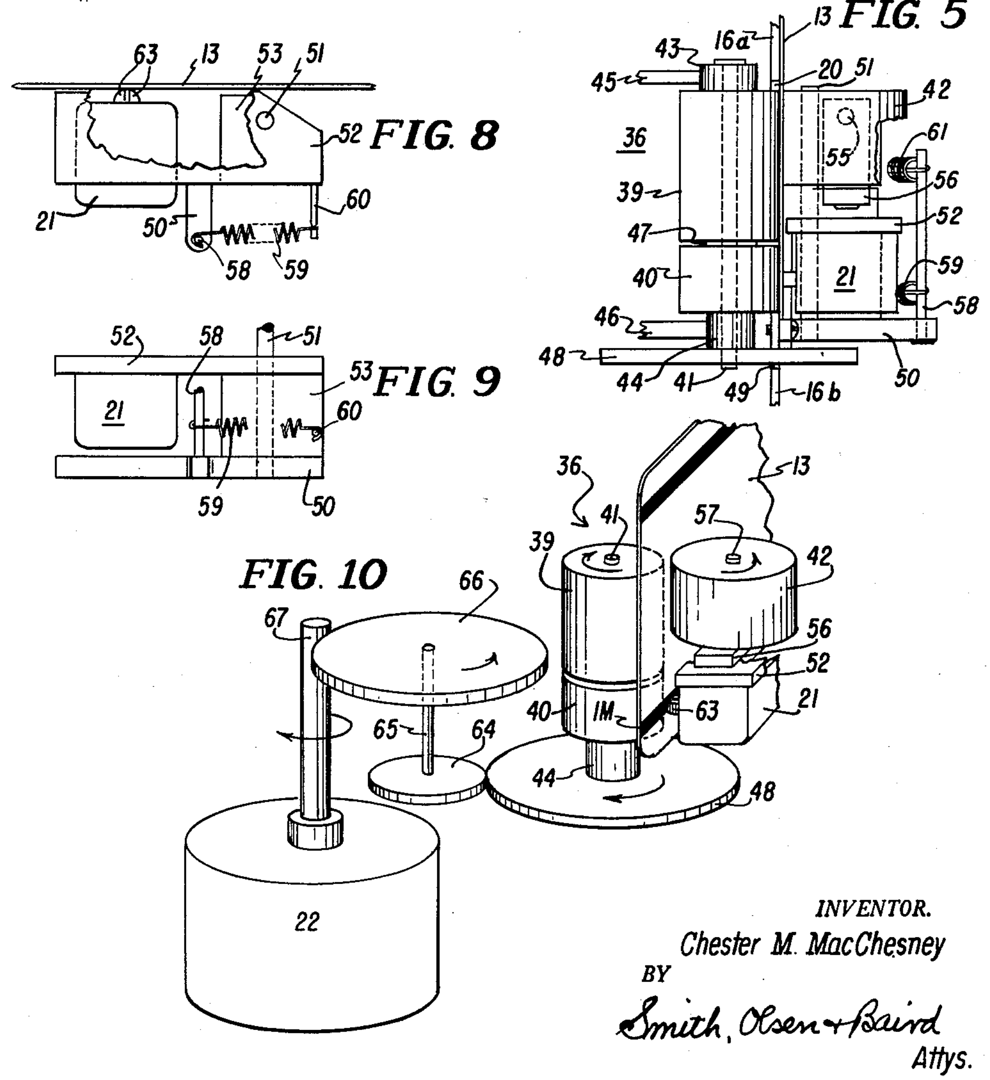
Fig. 10 is an enlarged fragmentary diagrammatic perspective view of the motor drive arrangement for the mechanism shown in Fig. 5.

Referring now to Fig. 10, the friction wheel 48 carried by the roller end of the axle 41 engages a friction wheel 64 carried by a shaft 65, that, in turn, carries a friction wheel 66 upon the upper end thereof. Finally, the friction wheel 66 is arranged in frictional engagement with the operating shaft 67 of the drive motor 22.

In the operation of the mechanism 36, the shaft 67 of the drive motor 22 is rotated in the clockwise direction, as viewed in Fig. 10, whereby the shaft 65 is rotated in the counterclockwise direction effecting rotation of the axle 41 in the clockwise direction through the friction drive, including the friction wheels 66, 64 and 48. The rotation of the axle 41 in the clockwise direction, as viewed in Fig. 10, propels or feeds the supported record card 13, at a speed of about 2.13 inches per second, from the right toward the left by virtue of the circumstance that the body of the record card 33 is clamped between the drive roller 39 and the floating roller 42. Also, at this time, the magnetic medium 1M, etc., is clamped between the floating roller 40 and the pole pieces 63 of the head 21 so that the magnetic recordings on the magnetic medium IM, etc., are sensed by the head 21 bringing about operation of the loudspeaker 25 to pronounce the recorded word, in the manner previously explained. Also, it will be understood that the arrangement of the pivot pins 51, 55 and 57 accommodates ready adjustment of the position of the floating roller 42 with respect to the drive roller 39 so that the body of the record card 13 is securely clamped in place therebetween to effect the friction drive noted above. Likewise the clamping action between the floating roller 40 and the pole pieces 63 of the head 21 insures proper contact between the pole pieces and the magnetic medium 1M, etc., carried by the record card 13. Furthermore, when the drive motor 22 is operating and the record card 13 is not in its feed position between the rollers 39 and 42, the pole pieces 63 engage the roller 40 and prevent rotation thereof, whereby in this idle operating condition of the unit 12, there is no wear upon the pole pieces 63.

Recapitulating, in the operation of the mechanism 36, with the record card 13 in position between the rollers 39 and 42, the drive roller 39 propels or feeds the card 13 from the right toward the left, whereby the card 13 actually rotates the floating rollers 42 and 40. This arrangement is very advantageous in view of the fact that the bias between the rollers 39 and 42 permits of small irregularities in the surface of the card 13 without disturbing the uniform and proper movement of the magnetic medium 1M, etc., longitudinally of the axis thereof across the pole pieces 63 of the head 21 during the sensing operation; and similarly the bias between the floating roller 40 and the pole pieces 63 permits of small irregularities in the magnetic medium 1M carried by the card 13 without disturbing the drive exerted upon the card 13 between the rollers 39 and 42.

In the foregoing description of the record card 13, it has been assumed that four words and four corresponding magnetic media are carried thereby for the purpose of studying the four related words, previously described; however, it is usually more convenient to employ the record card 13 only for the purpose of the study of the different variants of a single word. For the last-mentioned purpose, and in the usual case, the record card 13 will be provided with only two words and two corresponding magnetic media which two words may occupy the positions of the two words 1W and 2W or the positions of the two words 1W and 3W. In fact, it has been found most convenient to arrange the two words in the positions of the two words 1W and 3W of the record card 13, shown in Figs. 3A and 3C. Moreover, it will be appreciated that it is not necessary that all of the sets of record cards be of the same size since the sensing of the record card 13 takes place adjacent to and with reference to the bottom edge thereof in the utilization of the unit 12. Furthermore, the record cards may have a configuration other than rectangular permitting a record card to carry more than four words and four corresponding magnetic media. For example, by employing a square record card, eight words and eight corresponding magnetic media may be readily accommodated. Finally, the record cards may be formed of materials other than paper, such for example as the various plastic materials, including cellulose acetate, etc.; and the magnetic media 1M, etc., may take any conventional form. While the magnetic media 1M, etc., may consist of separate tapes secured to the surfaces of the record card 13, it is normally more convenient to print or paint them upon the surfaces of the record card utilizing commercially available paramagnetic printing or painting inks or materials.

In view of the foregoing, it is apparent that there has been provided phonetic sound pronouncing dictionary apparatus of the magnetic record card type capable of presenting simultaneously in a ready and convenient manner, both the visual aspects of a selected word or phrase and the proper and authentic pronunciation thereof, that embodies an improved record card guiding and feeding mechanism.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A sound reproduction unit comprising an upstanding front wall, a substantially horizontally disposed guide carried by said front wall and adapted to receive and to support the lower edge of an upstanding record card bearing on the front side thereof a substantially horizontal array of symbols indicative of the spelling of a given word and carrying on the front side thereof a vertically spaced and substantially horizontal magnetic medium having magnetically recorded thereon phonetic characters indicative of the pronunciation of the given word, a magnetic pick-up head disposed forwardly of said front wall and operatively associated with said guide, a friction drive operative to engage and to move in a substantially horizontal direction a record card supported by said guide to cause the magnetic medium carried thereby to be moved across said head, said friction drive including aligned driving and floating rollers, said driving roller being disposed in an opening formed in said front wall and engaging the rear side of a record card supported by said guide and said floating roller being disposed forwardly of said front wall and engaging the front side of a record card supported by said guide, motor means for operating said friction drive, said friction drive moving a record card supported by said guide from right to left from the position of an observer and at a relatively slow speed so that the symbols borne thereby are legible to the observer during the movement of the record card, means for operating said head to sense phonetic characters recorded on a magnetic medium moved thereacross as a record card is moved in said guide, a sound translating device, and means responsive to operation of said head to sense phonetic characters for operating said device to produce corresponding phonetic sounds.

2. The sound reproduction unit set forth in claim 1, and further comprising a casing of which said front wall is an element, said casing housing said motor means and said sound translating device and carrying a foot for supporting said front wall in a normal position sloping upwardly and rearwardly with respect to a horizontal plane.

3. The sound reproduction unit set forth in claim 1, wherein said guide essentially comprises two open-ended and aligned rails respectively disposed on opposite sides of said opening formed in said front wall, and further comprises an idler roller disposed forwardly of said front wall and above said left-hand guide rail and engaging the front side of a record card supported by said left-hand guide rail in order to prevent tilting thereof as the left-hand side of a record card moves out of the left-hand open end of said left-hand guide rail.

4. In combination, an upstanding wall having an opening therethrough, an upstanding record card disposed upon the front side of said wall and carrying a substantially horizontal magnetic medium having magnetic recordings thereon, a substantially horizontally disposed guide carried by the front side of said wall and receiving and supporting the lower edge of said upstanding record card, a first roller mounted for rotation about a substantially vertical axis and arranged on the rear side of said wall and projecting into said opening and engaging the rear side of said record card, a second roller mounted for rotation about a substantially vertical axis and arranged on the front side of said wall and aligned with said first roller and engaging the front side of said record card, means for resiliently biasing said second roller toward said first roller in order to clamp said record card therebetween, motor means for rotating said first roller so as to move said record card upon said wall in its substantially horizontal supported position in said guide, a magnetic pick-up head carried by said wall and operatively associated with said magnetic medium, and means for operating said head to sense said magnetic recordings as said record card is moved in said guide.

5. In combination, an upstanding wall having an opening therethrough, an upstanding record card disposed upon the front side of said wall and carrying a substantially horizontal magnetic medium having magnetic recordings thereon, a substantially horizontally disposed guide carried by the front side of said wall and receiving and supporting the lower edge of said upstanding record card, a first roller mounted for rotation about a substantially vertical axis and arranged on the rear side of said wall and projecting into said opening and engaging the rear side of said record card, a first bracket carried on the front side of said wall adjacent to said opening, a first substantially vertically disposed pivot pin carried by said first bracket, a block pivotally mounted upon said first pivot pin, a second substantially horizontally disposed pivot pin carried by said block, a second bracket pivotally mounted upon said second pivot pin, an axle carried by said second bracket and having a substantially vertical axis, a second roller mounted for rotation upon said axle and aligned with said first roller and engaging the front side of said record card, means for resiliently biasing said second roller toward said first roller in order to clamp said record card therebetween, motor means for rotating said first roller so as to move said record card upon said wall in its substantially horizontal supported position in said guide, a magnetic pick-up head carried by said wall and operatively associated with said magnetic medium, and means for operating said head to sense said magnetic recordings as said record card is moved in said guide.

6. In combination, an upstanding wall having an opening therethrough, an upstanding record card disposed upon the front side of said wall and carrying a substantially horizontal magnetic medium having magnetic recordings thereon, a substantially horizontally disposed guide carried by the front side of said wall and receiving and supporting the lower edge of said upstanding record card, a roller mounted for rotation about a substantially vertical axis and arranged on the rear side of said wall and projecting into said opening and engaging the rear side of said record card, a magnetic pick-up head arranged on the front side of said wall and aligned with said roller and operatively associated with said magnetic medium, means for resiliently biasing said head toward said roller in order to clamp said record card therebetween, means for moving said record card upon said wall in its substantially horizontal supported position in said guide, and means for operating said head to sense said magnetic recordings as said record card is moved in said guide.

7. In combination, an upstanding wall having an opening therethrough, an upstanding record card disposed upon the front side of said wall and carrying a substantially horizontal magnetic medium having magnetic recordings thereon, a substantially horizontally disposed guide carried by the front side of said wall and receiving and supporting the lower edge of said upstanding record card, a first roller mounted for rotation about a substantially vertical axis and arranged on the rear side of said wall and projecting into said opening and engaging the rear side of said record card, a second roller mounted for rotation about a substantially vertical axis and arranged on the front side of said wall and aligned with said first roller and engaging the front side of said record card, means for resiliently biasing said second roller toward said first roller in order to clamp said record card therebetween, a third roller mounted for rotation about a substantially vertical axis and arranged on the rear side of said wall and projecting into said opening and engaging the rear side of said record card, a magnetic pick-up head arranged on the front side of said wall and aligned with said third roller and operatively associated with said magnetic medium, means for resiliently biasing said head toward said third roller in order to clamp said record card therebetween, motor means for rotating said first roller so as to move said record card upon said wall in its substantially horizontal supported position in said guide, and means for operating said head to sense said magnetic recordings as said record card is moved in said guide.

8. In combination, an upstanding wall having an opening therethrough, an upstanding record card disposed upon the front side of said wall and carrying a substantially horizontal magnetic medium having magnetic recordings thereon, a substantially horizontally disposed guide carried by the front side of said wall and receiving and supporting the lower edge of said upstanding record card, an axle disposed on the rear side of said front wall and having a substantially vertical axis, a first roller rigidly secured to said axle and projecting into said opening and engaging the rear side of said record card, a second roller mounted for rotation about a substantially vertical axis and arranged on the front side of said wall and aligned with said first roller and engaging the front side of said record card, means for resiliently biasing said second roller toward said first roller in order to clamp said record card therebetween, a third roller loosely mounted upon said axle and projecting into said opening and engaging the rear side of said second card, a magnetic pick-up head arranged on the front side of said wall and aligned with said third roller and operatively associated with said magnetic medium, means for resiliently biasing said head toward said third roller in order to clamp said record card therebetween, motor means for rotating said axle so as to cause said first roller to move said record card upon said wall in its substantially horizontal supported position in said guide, and means for operating said head to sense said magnetic recordings as said record card is moved in said guide.

9. The combination set forth in claim 8, wherein said first roller is disposed above said third roller, and said second roller is disposed above said head.

10. In combination, a wall carrying an index, a record card supported upon said wall and carrying on one side thereof an elongated magnetic medium having magnetic recordings thereon, guide and feeding means for moving said record card in its supported position upon said wall so that said magnetic medium traverses said index longitudinally of the axis of said magnetic medium, a magnetic pick-up head disposed on said one side of said record card adjacent to said index and cooperating with said magnetic medium, a backing member disposed on the opposite side of said record card adjacent to said index and aligned with said head, resilient means biasing said head and said member toward each other so that said head and said member respectively engage the opposite sides of said record card adjacent to said index exerting therebetween a clamping action upon said record card, and means for operating said head to sense said magnetic recordings as said magnetic medium is moved longitudinally of the axis thereof across said head.

11. The combination set forth in claim 10, wherein said index carried by said wall essentially comprises an opening formed therethrough, and said backing member essentially comprises a roller projecting into said opening and mounted for rotation about an axis disposed substantially at 90° to the direction of movement of the longitudinal axis of said magnetic medium.

12. The combination set forth in claim 10, wherein said head is pivotally mounted for movements toward and away from said backing member and is spring biased toward said backing member.

13. The sound reproduction unit set forth in claim 1, wherein said head and said floating roller are disposed above said guide but well below the array of symbols borne on the front side of a record card supported by said guide.

14. The sound reproduction unit set forth in claim 1, wherein said guide comprises two sections respectively disposed on opposite sides of said opening formed in said front wall, said guide section disposed on the right-hand side of said opening from the position of an observer being sufficiently long completely to support a record card in a stationary position thereon to be observed without engagement with said friction drive.

15. The combination set forth in claim 8, wherein engagement of said third roller by said head when said record card is removed from therebetween arrests rotation of said third roller notwithstanding rotation of said axle.

References Cited in the file of this patent

UNITED STATES PATENTS

| Number | Name | Date |
|---|---|---|
| 2,107,008 | Lasker | Feb. 1, 1938 |
| 2,265,462 | Weitmann | Dec. 9, 1941 |
| 2,493,848 | Ayres | Jan. 10, 1950 |
| 2,603,006 | MacChesney et al. | July 15, 1952 |